US010663749B2

(12) United States Patent
Schwedt et al.

(10) Patent No.: US 10,663,749 B2
(45) Date of Patent: May 26, 2020

(54) LIGHT MICROSCOPE AND OPTICAL ASSEMBLY TO PROVIDE STRUCTURED ILLUMINATING LIGHT TO EXAMINE SAMPLES

(71) Applicant: Carl Zeiss Microscopy GmbH, Jena (DE)

(72) Inventors: Daniel Schwedt, Weimar (DE); Tiemo Anhut, Jena (DE); Ralf Netz, Jena (DE)

(73) Assignee: Carl Zeiss Microscopy GmbH, Jena (DE)

( * ) Notice: Subject to any disclaimer, the term of this patent is extended or adjusted under 35 U.S.C. 154(b) by 109 days.

(21) Appl. No.: 14/436,641

(22) PCT Filed: Oct. 9, 2013

(86) PCT No.: PCT/EP2013/071076
§ 371 (c)(1),
(2) Date: Apr. 17, 2015

(87) PCT Pub. No.: WO2014/060270
PCT Pub. Date: Apr. 24, 2014

(65) Prior Publication Data
US 2015/0248015 A1 Sep. 3, 2015

(30) Foreign Application Priority Data

Oct. 17, 2012 (DE) .................. 10 2012 020 877

(51) Int. Cl.
*G02B 27/58* (2006.01)
*G02B 21/00* (2006.01)
(Continued)

(52) U.S. Cl.
CPC ......... *G02B 27/58* (2013.01); *G02B 21/0032* (2013.01); *G02B 21/0092* (2013.01);
(Continued)

(58) Field of Classification Search
CPC .......... G02B 13/003; G02B 9/06; G02B 9/04; G02B 13/18; G02B 13/24; G02B 27/58;
(Continued)

(56) References Cited

U.S. PATENT DOCUMENTS 9,151,894 B2 * 10/2015 Okano .................. G02B 6/125
2009/0225407 A1 * 9/2009 Nakayama ............. G02B 21/16
359/370
(Continued)

FOREIGN PATENT DOCUMENTS

DE    10 2006 009 833 A1    9/2007
DE    10 2007 040 238 A1    3/2009
(Continued)

OTHER PUBLICATIONS

English translation of International Preliminary Report on Patentability (Chapter 1) and Written Opinion of International Searching Authority.
(Continued)

*Primary Examiner* — William R Alexander
*Assistant Examiner* — Henry A Duong
(74) *Attorney, Agent, or Firm* — Duane Morris LLP

(57) ABSTRACT

An optical assembly that is designed for positioning in a beam path of a light microscope having means for providing structured illuminating light in a sample plane of the light microscope, so that structured illuminating light can be generated in different orientations. The optical assembly has an adjustable deflector in order to deflect an incident light bundle onto one of several beam paths in a selectable manner. Beam splitting devices are located in the beam paths in order to split the light bundle of the respective beam paths into partial light bundles, which are spatially separated from each other. Beam guides are provided for each of the partial light bundles, and guide the partial light bundles to a pupil
(Continued)

plane. The beam guides are arranged in such a way that the partial light bundles that belong to the same beam path form a light spot pattern in the pupil plane; and that the light spot patterns of different beam paths in the pupil plane are different from each other.

22 Claims, 3 Drawing Sheets

(52) U.S. Cl.
 CPC ........ *G02B 26/0816* (2013.01); *G02F 1/0115* (2013.01); *G02F 1/0147* (2013.01); *G02F 1/11* (2013.01)

(58) Field of Classification Search
 CPC ............ G02B 21/0092; G02B 26/0816; G02B 21/0032; G02B 26/105; G02B 26/12; G02B 26/121; G02F 1/0115; G02F 1/11; G02F 1/0147
 USPC ................................................ 359/794, 226.1
 See application file for complete search history.

(56) References Cited

U.S. PATENT DOCUMENTS

2011/0133101 A1   6/2011   Viellerobe et al.
2011/0194175 A1   8/2011   Dougherty et al.

FOREIGN PATENT DOCUMENTS

| DE | 10 2007 047 466 A1 | 4/2009 |
| DE | 102007047465 A1 | 4/2009 |
| DE | 102011077269 A1 | 12/2012 |
| EP | 0 683 412 A1 | 11/1995 |
| WO | WO 02/044826 A2 | 6/2002 |

OTHER PUBLICATIONS

Gustafsson, Mats G.L. et al.; "Doubling the lateral resolution of wide-field fluorescence microscopy using structured illumination"; Proceedings of SPIE 2000; 3919:141-150.

Heintzmann, R., et al; "Laterally Modulated Excitation Microscopy: Improvement of resolution by using a diffraction grating"; Proceedings of SPIE 1998; 3568:185-196.

Heintzmann, R., et al.; "Saturated patterned excitation microscopy—a concept for optical resolution improvement"; J. Opt. Soc. Am. A 2002: 19(8):1599-1609.

Shao, Lin, et al.; "Super-resolution 3D microscopy of live whole cells using structured illumination"; Nature Methods: doi:10.1038/nmeh.1734.

Shao, lin, et al.; "Super-resolution 3D microscopy of live whole cells using structured illumination"; Nature Methods 2011; 8(12):1044-1046.

\* cited by examiner

LIGHT MICROSCOPE AND OPTICAL ASSEMBLY TO PROVIDE STRUCTURED ILLUMINATING LIGHT TO EXAMINE SAMPLES

RELATED APPLICATIONS

The present application is a U.S. National Stage application of International PCT Application No. PCT/EP2013/071076 filed on Oct. 9, 2013 which claims priority benefit of German Application No. DE 10 2012 020 877.4 filed on Oct. 17, 2012, the contents of each are incorporated by reference in their entirety.

FIELD OF THE INVENTION

The present invention relates, in a first aspect, to an optical assembly for positioning in a beam path of a light microscope according to the preamble of claim 1. In an additional aspect the invention relates to a light microscope according to the preamble of claim 20.

BACKGROUND OF THE INVENTION

A generic optical assembly comprises means for providing structured illuminating light in a sample plane of the light microscope, so that structured illuminating light can be generated in different orientations.

A generic light microscope having a beam path, in which such an optical assembly can be positioned, has at least one light source for emitting a light bundle. The light bundle can be directed in the direction of a sample plane, in which a sample to be examined can be positioned. The optical assembly makes it possible to direct this light bundle as structured illumination onto the sample.

The microscopy with structured illumination (structured illumination microscopy SIM) is an established method for examining a sample with high resolution. Structured illuminating light may be defined, in principle, as any light with a spatially variable intensity distribution over the cross section of the beam. In particular, light with a periodic intensity distribution over the cross section can be used.

Conventional means for providing structured illuminating light comprise at least one grating, which is positioned in an intermediate image plane, i.e. in a plane conjugate to the sample plane. As a result, the grating is mapped in the sample plane. Consequently, the structured illumination is formed, according to the grating structure, by means of a line pattern with illuminated and non-illuminated lines.

The goal is to generate the structured illumination in different orientations in the sample plane, i.e. at different angles of rotation around an optical axis. In addition, it ought to be possible to set a plurality of phases of the structured illumination for each orientation. For this purpose, the structured illumination in the sample plane can be displaced in a direction transversely to the lines of the line pattern. An image of the sample is taken for each of the different orientations and phases, from which then a sample image with a higher resolution is calculated.

This higher resolution represents a significant advantage over the conventional capturing of wide-field images without structured illumination. However, the time required to produce an image takes longer in microscopy with structured illumination. Therefore, one of the basic objectives is to keep the time needed to capture the different sample images low. At the same time, the goal is to make the design of the device simple and inexpensive.

These requirements are not met by conventional optical assemblies.

Thus, it is known from the prior art to use a single grating for imaging different grating orientations and then to rotate said grating into different orientations. An optical image field rotator, for example, an Abbe-Konig prism, can also be used behind the grating. This strategy can be used to produce an image field rotation and, thus, a rotation of the grating mapping in the sample plane. The rotation of a grating or an image field rotator is relatively time-consuming. In addition, disturbing reflexes of light diffraction can occur.

As an alternative, it is possible to use an optical beam splitter to generate the interfering beams. However, such a measure is complicated in terms of equipment and can be problematic in terms of stability.

In addition, a structured illumination can be generated with a pattern of light dots in the pupil plane. Such a dot pattern leads, by means of the Fourier transformation, to a stripe pattern in the sample plane. This pattern is achieved with an assembly that is described in the DE 10 2007 047 466 A1. It is possible to switch between different light dot patterns by selectively blocking the light.

Furthermore, it is known to provide gratings of varying orientation that are superimposed on a substrate. Light of a desired order of diffraction is directed to the sample, while other orders of diffraction are cut out. However, the net result is that the intensity loss is high.

It is also possible to select a plurality of gratings of different orientations one after the other with motorized grating changers. However, in this case, the amount of time required to switch between the gratings is also excessive.

Therefore, on the whole the optical assemblies known from the prior art exhibit a long delay when switching between different orientations of the structured illuminating light and/or have high mechanical requirements, for example in terms of a high positioning accuracy of moveable optical components. In addition, undesired intensity losses of the illuminating light may occur.

It may be considered to be the aim of the present invention that the object is to provide an optical assembly and a light microscope in such a way that both the optical assembly and the light microscope make it possible to switch rapidly between the structured illuminating light of different orientations with a design that is as simple as possible.

This engineering object is achieved with the optical assembly exhibiting the features disclosed in patent claim 1 and with the light microscope exhibiting the features disclosed in patent claim 20.

Preferred embodiments of the inventive optical assembly and the inventive light microscope are the subject matter of the dependent claims and are explained in the following description, in particular, in conjunction with the figures.

An optical assembly of the aforementioned type is characterized according to the invention in that adjustable deflecting means are present in order to deflect an incident light bundle onto one of several beam paths in a selectable manner; that beam splitting means are present in the beam paths, in order to split the light bundle of the respective beam path into partial light bundles, which are spatially separated from each other; that beam guiding means are present for each of the partial light bundles, and said beam guiding means guide the associated partial light bundles to a pupil plane; and that the beam guiding means are arranged in such a way that the partial light bundles that belong to the same beam path form a light spot pattern in the pupil plane; and that the light spot patterns of different beam paths in the pupil plane are different from each other.

In a light microscope of the aforementioned type, there is, according to the invention, an inventive optical assembly that can be arranged in such a way that light bundles of the light source can be directed to the adjustable deflecting means. In so doing, light beams can also be directed to the deflecting means by means of other components of the optical assembly. The optical assembly passes the outgoing light to a sample plane, where it impinges on a sample as structured illumination.

The first basic idea of the invention is that in order to switch between different orientations of the structured illuminating light, the selected beam path, i.e. the illuminated beam path, is changed. To this end, only a movement of the adjustable deflecting means is required. Preferably, no additional components have to be adjusted mechanically. A movement of the deflecting means can take place much faster than, for example, moving the gratings in and out of the beam path, as is the case in many conventional optical assemblies. Structured illuminating light of different orientations can be generated in succession in the sample plane in that the adjustable deflecting means of the invention select the different beam paths one after the other.

An inexpensive design with simultaneously very low light loss is achieved by means of the particular generation of structured illuminating light and by means of the way, in which the different beam paths, over which the structured illuminating light of different orientations is provided, are combined.

In contrast to conventional optical assemblies, the invention does not require gratings or other structured objects that are positioned in a plane conjugate to the sample plane as a means for providing structured illuminating light. Instead, a variety of different light spot patterns can be generated in a pupil plane. The pupil plane is supposed to be such a plane, in which the light intensity distribution by means of a Fourier transformation coincides with the light intensity distribution in the sample plane. Preferably, fastening means are present for positioning the optical assembly in a beam path of a light microscope, se such that the light distribution of light in the pupil plane is determined by means of a Fourier transformation of the light distribution in the sample plane.

Therefore, a light spot pattern in the pupil plane leads to a line pattern or another periodic pattern in the sample plane. As a result, the same patterns can be generated in the sample plane, as with a grating in an intermediate image plane. A light spot pattern may comprise, for example, a central illuminated region, which corresponds to zero order of diffraction of a grating. In addition, the light spot pattern may comprise two outer illuminated regions, which correspond to the +1st and the −1st order of diffraction of a grating.

Therefore, in the optical assembly according to the invention, the means for providing structured illuminating light comprise the beam splitting means and the beam guiding means, by means of which a light bundle of one of the beam paths is divided into a plurality of partial light bundles and forms a light spot pattern in the pupil plane.

An additional essential idea can be seen in the fact that the beam splitting means are present in each of the selectable beam paths. Hence, a large number of spatially separated partial light bundles can be selected, even if an equally large number of beam paths, which can be selected by means of the deflecting means, are not present. The net result is that the adjustable deflecting means can select one of the light spot patterns in a very short period of time. In contrast to known fiber switching units, in which light is coupled in a switchable manner into a plurality of light conducting fibers, the splitting into partial light bundles also takes place separately from the selecting by means of the deflecting means. As a result, the splitting into partial light bundles can occur advantageously without movements or switching operations, a feature that is associated with better stability.

The light bundles of different beam paths are directed into the pupil plane as different light spot patterns. That is, the light spot patterns do not overlap or at least do not completely overlap in the pupil plane.

A light spot pattern may be defined as any pattern of illuminated regions, which are spatially spaced apart from each other. These regions are preferably circular, but may also have any other shape.

The beam splitting means may comprise any means, by means of which an incident light bundle is divided simultaneously into two or more partial light bundles, which are spatially separated from each other. Then, the partial light bundles can be directed by means of beam guiding means into the pupil plane, where the cross section of the partial light bundles forms a light spot pattern.

A light bundle may be defined as the emitted light or the light beam of a light source. This light is supposed to be visually coherent. Since each spot pattern is formed from the partial light bundles of a single light bundle, it is possible to achieve the objective that the partial light bundles of the same light spot pattern are visually coherent with each other. As a result, the partial light bundles in the sample plane can interfere with each other and lead to the desired structured illuminating light.

It is possible to merge the previously separated beam paths by guiding the partial light bundles of all of the beam paths next to each other into the pupil plane. The result of this merging of the beam paths is that there is advantageously no loss of light or only a slight loss of light. In addition, the merging does not require any moving parts, is relatively insensitive to external influences and can be carried out inexpensively.

The time required to alternate between the different orientations of the structured illumination can be determined solely by means of the switching time of the adjustable deflecting means, which have preferably a deflecting mirror that can be rotated and/or displaced. In this embodiment, the selection of a particular beam path requires only a slight rotation or displacement of the deflecting mirror. In comparison to the retraction and extension of an entire optical component, for example a grating, the required movement is small and can be performed quickly. In addition, a deflecting mirror may have smaller dimensions and less weight than a grating for generating structured illuminating light. As a result, the deflecting mirror can be adjusted in just a few milliseconds. In principle, a rotatable and/or displaceable prism can also be used, instead of a deflecting mirror.

A reliable guiding of the beam onto the various beam paths can be achieved when a first group of optical fibers is present in order to direct the light bundles from the deflecting means to the beam splitting means. This first group has preferably one optical fiber for each of the various beam paths. Preferably the beam is guided by the deflecting means to the beam splitting means without mirrors or prisms, so that the stability is improved and the requirements for the positioning accuracy of the existing components are easier to fulfill.

In principle, the beam splitting means may be formed by a plurality of partially transparent mirrors. However, a particularly compact design can be achieved with high stability against external influences, when the beam splitting means comprise a waveguide chip. This waveguide chip has a substrate or carrier substrate and light conducting paths for directing the light bundles and the partial light bundles. The light conducting paths are formed by a light transmissive material in or on the substrate. The light conducting paths can be produced, for example, with lithography technology or also by means of an ion exchange. The waveguide chip can have an inherently rigid structure, i.e. is free of components that move relative to each other. As a result, the stability of the beam guide is advantageously higher. A beam splitting can be achieved by dividing the various light conducting paths into two or more light conducting paths, for example in the form of a Y.

The light conducting paths of the waveguide chip can also be formed by optical fibers. A splitting of the light conducting paths can be achieved, in particular, with thin film filters. This thin film filter can be called a fiber multiplexer.

It is preferred that the waveguide chip comprises a plurality of inputs for coupling in the light bundles; that each of the beam paths, which can be selected by means of the deflecting means, leads to another of the inputs; that a light conducting path is formed at each of the inputs in the waveguide chip; that a first splitting point, which divides the associated light conducting path into two or more light conducting paths, is formed on each of the light conducting paths in the waveguide chip; that the waveguide chip has a plurality of outputs for coupling out the partial light bundles; and that each of the light conducting paths leads to one of the outputs, so that coherently coupled partial light bundles can be outputted through such outputs, which are illuminated by means of the same input.

Each of the optical fibers of the first group may be connected to one of the inputs of the waveguide chip. The light transmissive material, which forms the light conducting paths, and the surrounding material are selected in such a way that just the light alone can propagate along the light conducting paths. Owing to the fact that the light conducting paths are designed so as to be fixed in position, the waveguide chip is insensitive to shocks or other external influences. The light conducting paths of the waveguide chip can also be formed by means of optical fibers in certain sections or in its entirety.

Preferably, a second splitting point, at which the corresponding light conducting paths are split into two light conducting paths each, is formed at least for some of the light conducting paths in the waveguide chip. As a result, a light conducting path is split twice in succession at two splitting points, so that three light conducting paths are produced. Thus, one light bundle is divided into three light bundles.

In principle, a light bundle can be divided into an arbitrary ratio at one of the splitting points on the respective light conducting paths. Preferably, however, a light conducting path is divided into equal components between two light conducting paths. These equal components can correspond to the +1st and the −1st order of diffraction owing to their position in the pupil plane. For the light, which corresponds to the 0th order of diffraction, a low light output is already sufficient for a high image quality. For this purpose, a light conducting path can be divided into a total of three light conducting paths in the beam splitting means, so that the light output in one of these paths is less than in the other two.

Correspondingly, it can be provided that a splitting of the light is selected at the first and the second splitting points in such a way that two outputs of same light output are provided for each of the inputs, and an output that has a lower light output and at which the light output is lower than the light output at the two outputs of same light output. In principle, a light spot pattern can also be generated in the pupil plane with just two light conducting paths or with more than three light conducting paths. However, a large number of light conducting paths increase the positioning accuracy requirement with respect to the partial light bundles of a light spot pattern. Therefore, it is preferred that each light spot pattern be formed by exactly three light conducting paths. As a result, a high image quality can be achieved with a relatively compact design.

Preferably, the first splitting points are designed in such a way that one light bundle is divided into variable components between its respective two light conducting paths. These components may be, for example, in a ratio of 90:10 or 95:5 to each other. Those light conducting paths, onto which the smaller components of the light bundle are directed, can lead directly to the outputs of lower light output. On the other hand, the light conducting paths, onto which the larger components of the light bundle are directed, can lead to the second splitting points. Each of these second splitting points is designed preferably in such a way that the light is split into equal components between the associated two light conducting paths. These light conducting paths in turn can lead directly, i.e. without impinging on any additional splitting points, to the outputs of same light output. For a high beam quality of the structured illuminating light in the sample plane the two light conducting paths, which correspond to the +1st and −1st order of diffraction of a grating, should have the same light output. Due to the described splitting points, this requirement can be achieved in an advantageous way irrespective of the exact splitting ratio at the first splitting points. In addition, a 50:50 split can be used at the second splitting points, a feature that is technically easier to achieve and with greater precision than unequal components of the splitting.

The partial light bundles, which leave the beam splitting means on light conducting paths of the selected beam path, are supposed to be directed to the pupil plane. Preferably, the beam guiding means for directing the partial light bundles from the beam splitting means to the pupil plane have a second group of optical fibers. This second group has preferably an optical fiber for each of the partial light bundles. Thus, an optical fiber of the second group is connected to each output of the waveguide chip. The optical fibers make it possible to achieve a very high position of stability in an advantageous way.

In addition, optical fibers make it possible to vary the positions of the outgoing light in the pupil plane in a relatively simple way. For this purpose, a common fiber holder can be present for the optical fibers of the light conducting paths, which belong to the same beam path. As an alternative, a fiber holder can be present for all of the optical fibers of the second group. An orientation of the structured illumination can be varied by rotating or moving a fiber holder. Preferred are fiber holders that belong to different beam paths and that can be rotated relative to each other. In this case, a measurement interruption time can be reduced by moving a fiber holder, while a structured illumination is generated by means of the optical fibers of an additional fiber holder.

Preferably, the ends of the optical fibers are arranged in the pupil plane in such a way that they define the light spot pattern that is desired in each case. As an alternative, it is also possible to arrange one or more mirrors, on which the light from the optical fibers of the second group impinges, in the pupil plane. In principle, each of the optical fibers of the second group can also be replaced by one or more mirrors, so that the light spot patterns in the pupil plane are generated by the mirror arrangement. However, with optical fibers the amount of equipment that is required is less; and the position stability is higher.

In another alternative, the beam guiding means are formed by light conducting paths inside the waveguide chip. In this case, the outputs of the waveguide chip can be arranged in the pupil plane in accordance with the desired light spot patterns.

It is preferred that such beam guiding means, which are connected to an output of lower light output, lead to a central region in the pupil plane, and that such beam guiding means, which are connected to one of the outputs of same light output, lead to the outer regions in the pupil plane. Therefore, in this embodiment, a light spot pattern is formed by a partial light bundle in the central region of the pupil plane, and two partial light bundles are formed in outer regions of the pupil plane. Owing to the position of these three partial light bundles in the pupil plane, said three partial light bundles correspond preferably to the −1st, 0th, and +1st order of diffraction of a grating, which is arranged in a plane that relates to the pupil plane due to a Fourier transformation. The partial light bundles of different light spot patterns, which are arranged in the central region, can be positioned next to each other there. For this purpose, the ends of the corresponding optical fibers of the second group may be arranged adjacent to each other, preferably directly next to each other, in the central region of the pupil plane.

Preferably, the two beam guiding means, which are connected to one of the outputs of same light output and which are illuminated by means of the same beam path, are arranged in such a way that the partial light bundles, issuing from these beam guiding means, are located opposite each other with respect to the central region in the pupil plane. Therefore, the three partial light bundles, which form a light spot pattern, are approximately on a straight line. This feature takes into account the fact that the −1st and the +1st order of diffraction of a grating are symmetrical to each other in relation to the 0th order of diffraction. Minor deviations from this symmetry, which can result from the arrangement of various optical fibers next to each other in the central region, have only a small effect on the pattern of the structured illumination in the sample plane.

Nevertheless, it is possible to provide a compensation for these effects on the structured illumination. To this end, a reference image can be captured with each of the different light spot patterns. The intensity distribution in these reference images can be used to evaluate the sample images that were captured at a later time.

When structured illuminating light is used, the image quality is dependent on the direction of polarization of the light that is generated. If the structured illuminating light in the sample plane is formed by means of a line pattern, then the direction of polarization of the light should be parallel to the line direction of the line pattern. This requirement can be satisfied, if the optical fibers of the first and the second group as well as the light conducting paths of the waveguide chip are polarization maintaining. In addition, these optical fibers are arranged preferably in such a way that the direction of polarization of the partial light bundles, issuing from the optical fibers of the second group, is transverse, in particular perpendicular, to a connecting straight line, which connects two partial light bundles of the same beam path in the pupil plane.

In addition to the different orientations of the structured illumination, where, in this case, the different orientations can be selected by means of the different light spot patterns, a phase shift of the structured illumination should also be possible. Said phase shift can be achieved by changing the phase relationship between the partial light bundles that together form one of the light spot patterns.

In a preferred embodiment of the optical assembly according to the invention, thermal phase shifters are present for phase shifting of a structured illumination that can be generated by means of one of the light spot patterns. A thermal phase shifter has means for controlling the temperature of the optical fibers of the second group and/or the light conducting paths of the waveguide chip, where, in this case, the optical fibers of the second group and/or the light conducting paths of the waveguide chip have temperature dependent refractive indices. Since the various optical fibers or the light conducting paths are heated in different ways, a phase shifting can occur in a very short period of time, for example, within a few milliseconds. In addition, no mechanical movements are required.

As an alternative or in addition, the phase relationship between the partial light beams of the same beam path can also be controlled by means of an electrical effect. To this end, it is preferably provided that the optical fibers of the second group and/or the light conducting paths of the waveguide chip have manipulation regions, in which a refractive index is voltage dependent; that electro-optic modulators, which define the refractive index in the adjacent region by means of an adjustable voltage, are present adjacent to the manipulation regions; and that electronic control means are present and configured to vary the refractive indices in the manipulation regions by means of the electro-optic modulators for the purpose of phase shifting a structured illumination that is generated by means of one of the light spot patterns. The manipulation regions may be formed, for example by means of a suitable material doping. The phase relationship can also be controlled very quickly by means of electro-optic modulators.

In order to reduce a measurement interruption time, the electronic control means can be configured to carry out a phase shifting for the partial light bundles of one of the beam paths, while another of the beam paths is selected by means of the deflecting means. This feature allows the measurement interruption time between snapshots of two sample images to be thereby reduced, especially when switching the deflecting means can be performed in less time than phase shifting.

For a cost-effective design, at least one phase plate can also be provided for phase shifting the structured illumination. This phase plate is arranged expediently between the beam splitting means and the sample plane and may comprise, for example, a light transmissive wedge that is moved or tilted for phase shifting. As an alternative, the phase plate can have a light transmissive plate with plane-parallel surfaces, where this plate is tilted for phase shifting.

The sample images that are captured using various light spot patterns are supposed to be used to calculate a higher resolution image. For this purpose, it is advantageous if different light spot patterns have the same light output. However, in particular due to coupling-in losses and coupling-out losses at the optical fibers, these light outputs may be different from each other. Therefore, it is desirable to be able to adjust the light output of different dot patterns in a variable manner. For this purpose, an acousto-optic device is present, preferably in front of the adjustable deflecting means. Electronic control means are present and configured to vary the output of a light bundle with the acousto-optic device, depending on which of the beam paths the light bundle is guided. The electronic control means may be configured to actuate the acousto-optic device in such a way that the light spot patterns of different beam paths have the same light output in the pupil plane. To this end, it is possible to use the results of the reference measurements, in which the brightness or the light output in the sample plane is measured for the different dot patterns without having a variable effect on the light output by means of the acousto-optic device.

In order to increase the number of different orientations of the structured illumination, an image field rotator can also be used. In this case, in order to change an orientation of the structured illumination, which is provided with one of the light spot patterns, an image field rotator is present in the beam path behind the beam guiding means. In addition, an actuating device for rotating the image field rotator is present. Of course, a change in the orientation of the structured illumination by switching the deflecting means is usually faster than rotating the image field rotator.

However, in principle, any number of different orientations of the structured illumination can be made possible with said image field rotator.

Preferably, a zoom lens is present in the beam path behind the beam guiding means for the purpose of a variable adjustment between a light conductance of an objective lens and a light conductance of the light spot patterns in the pupil plane. The light conductance of the light spot patterns in the pupil plane is determined by the distance between the outer partial light bundles and the numerical aperture of the partial light bundles, i.e. by their extension and the opening angle, at which the partial light bundles widen from the pupil plane. The zoom lens makes it possible to achieve that the light spot patterns are guided in their entirety through the objective lens into a sample plane. This feature is ensured by means of the zoom lens in an advantageous way for lenses with a variable numerical aperture.

The objective lens may be expediently a part of the light microscope according to the invention. Said lens is used to direct light emitted from the optical assembly. The described pupil plane of the optical assembly is optically conjugate to a pupil plane of the objective lens.

As a result, the objective lens allows the light, coming from the optical assembly, to be guided into the sample plane in such a way that a light intensity distribution in the sample plane relates to by means of a Fourier transformation coincides with the light intensity distribution in the pupil plane of the optical assembly due to a Fourier transformation. Therefore, in the sample plane, in which a sample that is to be examined can be positioned, the light, coming from the optical assembly, interferes in such a way that it forms a structured illumination. In addition, the objective lens can be used to guide detection light, coming from the sample, in the direction of a detector device.

BRIEF DESCRIPTION OF THE DRAWINGS

Additional properties and advantages of the invention are described below with reference to the accompanying schematic drawings, in which.

DESCRIPTION OF THE EMBODIMENTS

Figure 1:
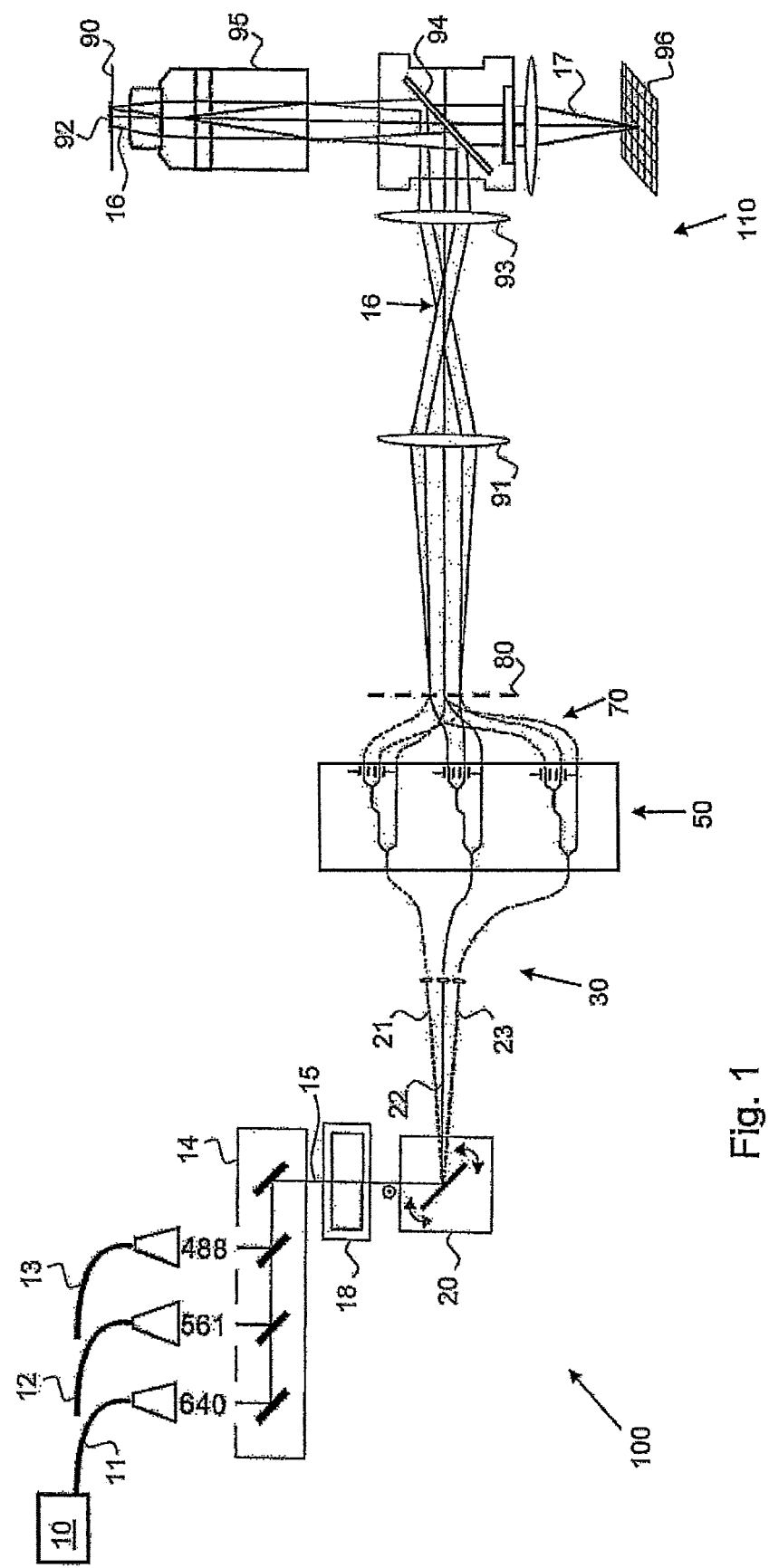
FIG. 1 is a schematic representation of an exemplary embodiment of an inventive light microscope with an optical assembly.

Identical and functionally equivalent components are usually provided with the same reference numerals in the figures.

FIG. 1 shows, in schematic form, an exemplary embodiment of an inventive light microscope 110 and an inventive optical assembly 100, which is positioned in a beam path of the light microscope 110.

Structured illuminating light 16 is generated by means of the optical assembly 100 in a sample plane 90 of the light microscope 110. For this purpose, unstructured light 15 is first generated from a light source 10 of the light microscope 110. Such a light bundle 15 is directed to the optical assembly 100. This optical assembly has means for providing structured illuminating light 16 from the light bundle 15.

In contrast to conventional optical assemblies, these means do not require a grating. Such a grating is usually arranged in an intermediate image plane, so that an image of the grating is generated in the sample plane as a structured illumination. However, a light spot pattern is generated in a pupil plane by means of the optical assembly 100 according to the invention. Hence, a pupil plane may be defined as a plane, in which the light distribution relates to the distribution of light in the sample plane by means of a Fourier transformation. As a result, a structured light, which is the same as or similar to the structured illumination by a means of grating, can be achieved by means a light spot pattern, in the sample plane 90.

In the optical assembly 100, the means for providing structured illuminating light include, in particular, adjustable deflecting means 20, beam splitting means 50 and beam guiding means 70.

First, the coherent light 15, i.e. light that is capable of interfering is emitted from the light source 10. In the illustrated example the light source 10 comprises a plurality of laser modules, by means of which the light 15 of the wavelengths 488 nm, 561 nm and 640 nm can be emitted. The light is guided from the laser modules over the optical fibers 11 to 13 to a mirror cascade 14, which bundles the light 15 of various laser modules into a common beam path by means of partially transmissive mirrors.

Then the light or the light bundle 15 impinges on an acousto-optic device 18. This acousto-optic device can be used to select, in particular, light of a desired wavelength and to pass the selected light to the adjustable deflecting means 20.

The deflecting means 20 comprise a deflecting mirror that can be rotated. This deflecting mirror can be quickly rotated by means of a galvanometer scanner or any other motor. The deflecting mirror 20 may also include one or more mirror surfaces, which are arranged side by side. The orientation of each of the mirror surfaces can be adjusted by means of a micro-electromechanical system (MEMS). As a result, the light bundle 15 can be directed in a selectable manner onto one of several spatially separated beam paths 21 to 23. Structured illuminating light in different orientations is generated by means of the various beam paths 21 to 23 (to be described below).

Figure 2:
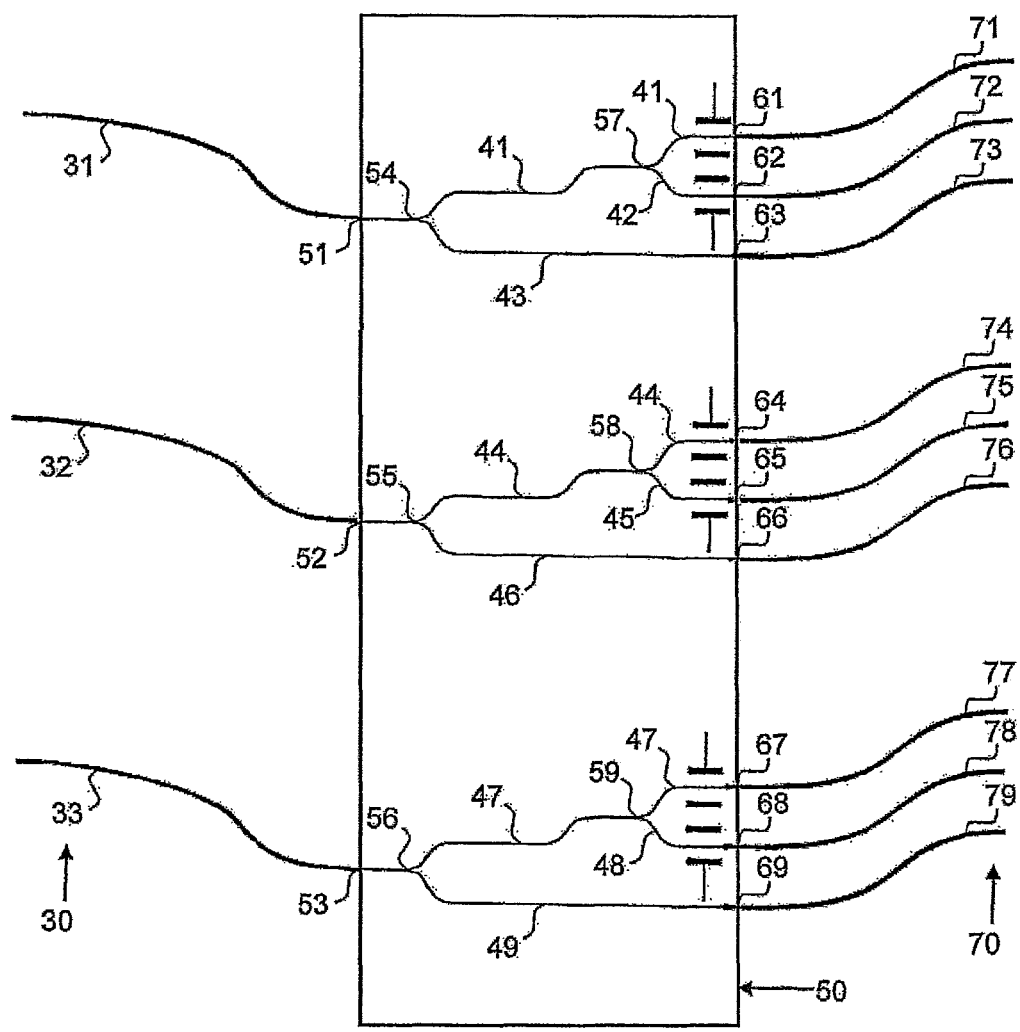
FIG. 2 is an enlarged view of components of the optical assembly from FIG. 1.

The beam paths 21 to 23 are guided to the beam splitting means 50 by means of a first group of optical fibers 30. For this purpose, reference is made to FIG. 2, which shows the optical fibers 30, the beam splitting means 50 and, downstream thereof, the beam guiding means 70 on an enlarged scale.

In this embodiment, the beam splitting means 50 are formed with a waveguide chip 50. This waveguide chip has a plurality of inputs 51 to 53 for coupling in the light bundles 15. The first group of optical fibers 30 comprises a plurality of optical fibers 31 to 33, each of which guides one of the beam paths 21 to 23 to one of the inputs 51 to 53. The optical fibers 31 to 33 have end caps, which are connected to connection means at the inputs 51 to 53 in such a way that no air gap is formed between them.

The waveguide chip 50 comprises a substrate, on which light conducting paths 41 to 49 are formed with a light transmissive material. In principle, these light conducting paths can also be formed by means of the optical fibers, which are held at one or more chips. As a result, the waveguide chip 50 can also be referred to as a fiber multiplexer.

Each of the inputs 51 to 53 is connected to a light conducting path, which leads in each case to a first splitting point 54 to 56. At each of these first splitting points 54 to 56, the associated light conducting path is split into two light conducting paths 41 and 43, 44 and 46, 47 and 49, which are spatially separated from each other. For this purpose, thin film filters (thin film filters TFF) can also be used. Thus, a light bundle is split into two light bundles at one of the first splitting points 54 to 56.

At the first splitting points 54 to 56, light is divided into unequal components between the two light conducting paths 41, 43, 44, 46, 47, 49. The light conducting paths 43, 46, 49, onto which the respective smaller component of the light is directed, lead directly to a respective output 63, 66, 69 of the waveguide chip 50. Onto these light conducting paths 43, 46, 49 preferably less than 20% of the light, which impinges on the corresponding first splitting point 54 to 56, is directed, for example 5% or 10%. The outputs 63, 66, 69 may also be referred to as outputs of lower light output.

The rest of the light travels on the light conducting paths 41, 44, 47 respectively to a second splitting point 57, 58, 59, where the light is split again into two light conducting paths 41 and 42, 44 and 45, 47 and 48. In so doing, the light is divided preferably into equal components between the associated two light conducting paths at the second splitting points 57 to 59. Eventually these light conducting paths also lead to the outputs 61, 62, 64, 65, 67 and 68 of the waveguide chip 50. These outputs can also be called outputs of same light output.

As a result, for each of the beam paths 21 to 23 a light bundle is divided into three partial light bundles that are capable of interfering with each other.

The beam guiding means 70 comprise a second group of optical fibers 71 to 79, each of which is connected to one of the outputs 61 to 69. The partial light bundles are guided to a pupil plane 80, which is shown in FIG. 1 and is enlarged in FIG. 3, by means of the optical fibers 71 to 79.

Figure 3:
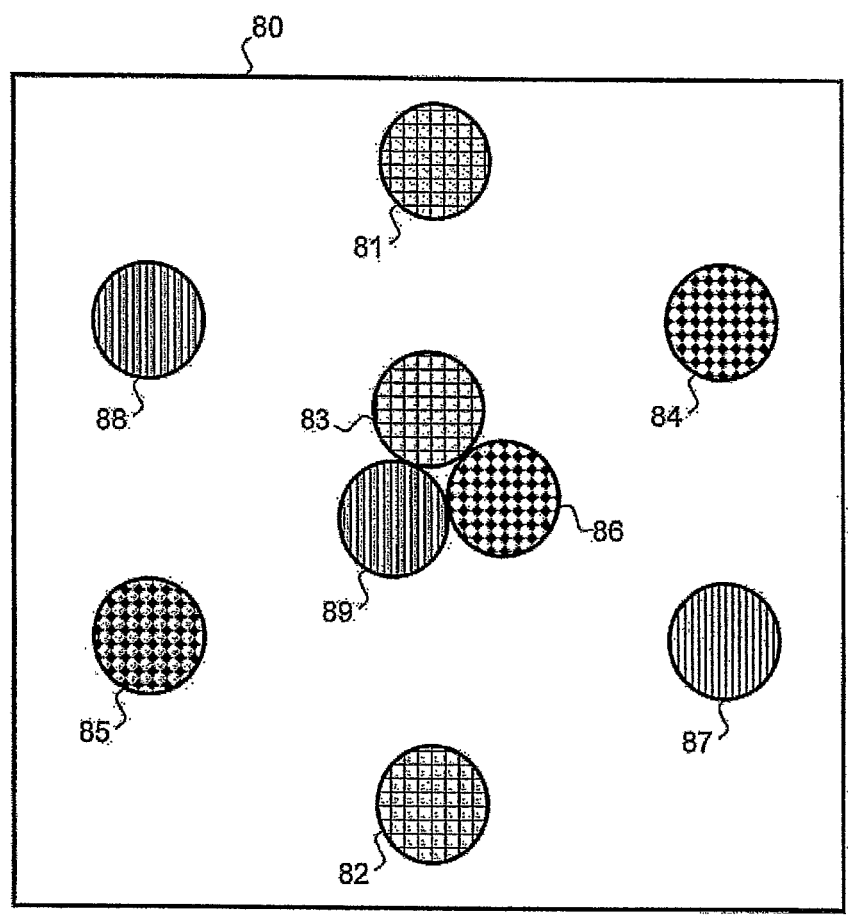
FIG. 3 is a schematic representation of light spot patterns that are generated in a pupil plane by means of an optical assembly according to the invention.

FIG. 3 shows in schematic form light spots, i.e. the cross sections of the partial light bundles 81 to 89, in the pupil plane 80. The arrangement of the partial light bundles 81 to 89 is determined by the arrangement of the optical fibers 71 to 79. In particular, the optical fibers 71 to 79 can terminate in the pupil plane 80, so that their arrangement agrees with the arrangement of the partial light bundles 81 to 89 that is shown in FIG. 3.

The partial light bundles 81 to 83, which belong to the beam path 21, form in the pupil plane 80 a light spot pattern of three illuminated regions that are spaced apart from each other. Similarly the three partial light bundles 84 to 86 and the partial light bundles 87 to 89 generate a second and a third light spot pattern in the same way. Of the various light spot patterns only one is generated at any time by means of the deflecting means. Since the different light spot patterns do not overlap or at least do not completely overlap, the structured illumination that is generated in the sample plane is different.

Each light spot pattern comprises a light spot in a central region of the pupil plane 80, i.e. in the region around an optical axis that extends centrally through a field of view. These light spots are generated by the partial light bundles 83, 86, 89, which had been guided from the waveguide chip 50 to the pupil plane 80 by way of the outputs of lower output 63, 66, 69.

The partial light bundles 83, 86, 89 in the central region correspond spatially to the 0th order of diffraction of a grating, which is located in an intermediate image plane. The two outer partial light bundles or partial light beams 81, 82, 84, 85, 87, 88 correspond spatially to the −1st and +1st order of diffraction of a grating in an intermediate image plane. Therefore, two partial light beams of the same beam path, for example, the partial light beams 81 and 82, are located opposite each other with respect to the central region. In particular, they may be opposite each other with respect to the optical axis or with respect to the associated partial light bundle 83, which is arranged in the central region.

Ideally, the partial light bundles 83, 86, 89, which belong to different beam paths and are guided into the central region, should be superposed one on top of the other. For this purpose, two or more of partial light bundles 83, 86, 89 are first brought together (not shown) in a common optical fiber and are then directed into the central region. Preferably, two or more of the partial light bundles 83, 86, 89 are combined in the waveguide chip. When two of the partial light bundles 83, 86, 89 are combined in the wave guide chip 50, all of the light conducting paths 41 to 49 can extend in one plane.

If three partial light bundles 83, 86, 89 are combined in the waveguide chip 50, then the associated light conducting paths 43, 46, 49 may extend in three dimensions. That is, they do not lie in one plane. If, as an alternative, all of the light conducting paths extend in one plane, then the various light conducting paths have to be prevented from crossing each other. This requirement can be met, if the outputs 61 to 69 at the waveguide chip 50 are offset from each other in a direction that points from the inputs 51 to 53 to the outputs 61 to 69. Then, the light conducting paths 43, 46, 49 can be merged downstream of the outputs of the other light conducting paths 41, 42, 44, 45, 47, 48, so that the various light conducting paths do not cut across each other.

The various light spot patterns may differ in their rotational orientation about the optical axis. Thus, in the example shown, the partial light beams 81 to 83 can be transferred into the partial light beams 84 to 86 by a rotation of 120 deg. about the optical axis. Due to the fact that the light spot patterns differ only in their orientation, the structured illumination in the sample plane also differs only in the orientation.

For a phase shifting of the structured illumination the positions and arrangements of the light spot patterns remain unchanged. Instead, the phase relationship between the partial light bundles of the same light spot pattern is varied in relation to each other. This feature affects the position of the regions in the sample plane, in which the three partial light bundles of a light spot pattern interfere constructively with one another. Consequently the phase of the structured illumination is changed.

In order to change the phase of the partial light bundles, the refractive index can be varied in a material, through which the respective partial light bundle moves. As a result, means for changing the refractive indices of the optical fibers 71 to 79 and/or the light conducting paths 41 to 49 can be present in the waveguide chip 50. These means may comprise, for example, an electro-optic modulator for changing a refractive index by means of an applied voltage. As an alternative, it is possible to use thermal phase shifter that can affect the refractive index by means of a temperature change.

The quality of the snapshot of a sample image is also dependent on the polarization of the structured illuminating light. In order to be able to define the direction of polarization of the partial light bundle 81 to 89, the optical fibers 31 to 39 and 71 to 79 as well as the light conducting paths 41 to 49 are polarization maintaining. The optical fibers are positioned in their rotational orientation in such a way that the direction of polarization of two partial light bundles of the same beam path is perpendicular to a connecting straight line between these partial light bundles in the pupil plane 80. Therefore, for the partial light bundle 81, a polarization direction is perpendicular to a connecting straight line, which connects the partial light bundle 81 to the partial light bundle 82 and/or to the partial light bundle 83 in the pupil plane 80.

FIG. 1 shows in schematic form that the partial light bundles, which are generated by splitting an unstructured light bundle 15, interfere with each other in an intermediate image plane and generate in this way structured illuminating light 16. This structured illuminating light is coupled into the light microscope with the optical imaging means 91, 93 by means of an optical interface of the light microscope 110, where it impinges on a color splitter 94. The color splitter 94 has a cutoff wavelength between transmission and reflection. Thus, the cutoff wavelength is selected in such a way that the structured illuminating light 16, coming from the optical assembly 100, is directed in the direction of an objective lens 95 and passed to the sample plane 90.

The numerical aperture of the objective lens 95 determines whether the structured illuminating light 16 can be directed completely or only partially into the sample plane 90. In order to ensure that all of the partial light beams of a light spot pattern are passed on in their entirety from the objective lens 95, the optical imaging means 91 comprise preferably a zoom lens.

Owing to the irradiation with structured illuminating light 16, a sample 92, which is located in the sample plane 90, emits detection light 17. This detection light may be, in particular, fluorescent light or phosphorescent light. The detection light 17 passes through the objective lens 95 and the color splitter 94 to a detector device 96, which is expediently a (spatial resolution) 3D camera.

In order to change the orientation of the structured illumination, it is advantageous that just a movement of the deflecting mirror 20 alone is required. This movement can take place in just a few milliseconds. The beam paths 21 to 23, which can be selected by means of the deflecting mirror 20, are combined in the pupil plane 80 with only minor light losses. The means required for this purpose are relatively inexpensive and stable with respect to external influences, such as vibrations. Therefore, compared to conventional optical assemblies and light microscopes, sample images of high quality can be captured with the invention in less time.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

LIST OF REFERENCE NUMERALS

10 light source
11 to 13 optical fibers for directing light of the light source
14 mirror cascade
15 light bundle
16 structured illuminating light
17 detection light
18 acousto-optic device
20 adjustable deflecting means, deflecting mirror
21 to 23 beam paths that can be selected by means of the deflecting means
30 first group of optical fibers
31 to 33 optical fibers of the first group 30
41 to 49 light conducting paths
50 beam splitting means, waveguide chip
51 to 53 inputs of the waveguide chip
54 to 56 first splitting points of the waveguide chip
57 to 59 second splitting points of the waveguide chip
61 to 69 outputs of the waveguide chip
70 beam guiding means, second group of optical fibers
71 to 79 optical fibers of the second group 70
80 pupil plane
81 to 89 partial light bundle
90 sample plane
91 optical imaging means
92 sample
93 optical imaging means
94 color splitter
95 objective lens
96 detector device
100 optical assembly
110 light microscope

What is claimed is:

1. Optical assembly for positioning in a beam path of a light microscope, comprising means for providing structured illuminating light in a sample plane of the light microscope, said structured illuminating light being generated in different orientations, an adjustable deflector to deflect an incident light bundle onto one of several beam paths in a selectable manner; beam splitting devices located in said beam paths to split said light bundle of the respective beam paths into partial light bundles, said partial light bundles being separated from each other, a beam guide associated with each of the partial light bundles, each said beam guide guides its respective associated partial light bundles to a pupil plane, said pupil plane in which light distribution relates to the distribution of light in the sample plane by a Fourier transformation, said beam guides arranged in such a way that said partial light bundles which belong to the same beam path, form a light spot pattern in the pupil plane, and wherein said light spot pattern of different beam paths in the pupil plane are different from each other.

2. Optical assembly, as claimed in claim 1, wherein said deflector has deflecting mirror that can be rotated and/or displaced.

3. Optical assembly, as claimed in claim 1, further comprising a first group of optical fibers to direct said light bundles from said deflector to said beam splitting device, said first group of optical fibers having one optical fiber for each of the various beam paths.

4. Optical assembly, as claimed in claim 1, wherein said beam splitting device comprises a waveguide chip having a substrate and light conducting paths for directing said light bundles and said partial light bundles, said light conducting paths being formed by a light transmissive material in or on said substrate.

5. Optical assembly, as claimed in claim 4, wherein said waveguide chip comprises a plurality of inputs for coupling in said light bundles; each of said beam paths, which can be selected by means of the deflectors, lead to another of said plurality of inputs, a light conducting path formed at each of the said plurality of inputs in said waveguide chip, a first splitting point, which divides the associated light conducting path into two light conducting paths, being formed on each of the light conducting paths in said waveguide chip, said waveguide chip having a plurality of outputs for coupling out the partial light, and each of said light conducting paths leads to one of said outputs, so that coherently coupled partial light bundles are outputted through said outputs which are illuminated by the same input.

6. Optical assembly, as claimed in claim 4 further comprising a second splitting point at which the corresponding light conducting paths are split into two light conducting paths each, said second splitting point being formed at least for some of the light conducting paths in said waveguide chip.

7. Optical assembly, as claimed in claim 6, wherein a division of the light is selected at the first and the second splitting points in such a way that two outputs of same light output are provided for each of the inputs, and an output that has a lower light output and at which the light output is lower than the light output at the two outputs of same light output.

8. Optical assembly, as claimed in claim 6, wherein the first splitting points are designed in such a way that one light bundle is divided into different components between the associated two light conducting paths, that those light conducting paths, onto which the smaller components of the light bundle are directed, lead directly to the outputs of lower light output; that the light conducting paths, onto which the larger components of the light bundle are directed, lead to the second splitting points; that each of these second splitting points is designed in such a way that a partial light bundle is divided into equal components between the associated two light conducting paths; and these light conducting paths lead directly to the outputs of same light output.

9. Optical assembly, as claimed in claim 8, wherein each said beam guide for directing the partial light bundles from the beam splitting means to the pupil plane have a second group of optical fibers, said second group of optical fibers having one optical fiber for each of the partial light bundles.

10. Optical assembly, as claimed in claim 8, wherein each said beam guide which is connected to an output of lower light output, lead to a central region in the pupil plane, and said beam guides which are connected to one of the outputs of same light output, lead to outer regions in the pupil plane.

11. Optical assembly, as claimed in claim 8, further comprising two beam guides which are connected to one of the outputs of the same light output and which are illuminated by means of the same beam path, are arranged in such a way that the partial light bundles, issuing from these beam guiding means, are opposite each other with respect to the central region in the pupil plane.

12. Optical assembly, as claimed in claim 1, wherein said optical fibers of the first and second groups are polarization maintaining and are arranged in such a way that the direction of polarization of the partial light bundles, which issue from the optical fibers of the second group, is perpendicular to a connecting straight line, which connects two partial light bundles of the same beam path in the pupil plane.

13. Optical assembly, as claimed in claim 1, further comprising thermal phase shifters for phase shifting of a structured illumination that can be generated by means of one of the light spot patterns; one of said thermal phase shifters having means for controlling temperature of the optical fibers of the second group and/or the light conducting paths of the waveguide chip, wherein the optical fibers of the second group and/or the light conducting paths of the waveguide chip have temperature dependent refractive indices.

14. Optical assembly, as claimed in claim 1, wherein said optical fibers of the second group and/or the light conducting paths of the waveguide chip have manipulation regions, in which a refractive index is voltage dependent; and further comprising electro-optic modulators adjacent to the manipulation regions; said electro-optic modulators define the refractive index in the adjacent region by means of an adjustable voltage, and electronic control means configured to vary the refractive indices in the manipulation regions by means of the electro-optic modulator for phase shifting a structured illumination that is generated by means of one of the light spot patterns.

15. Optical assembly, as claimed in claim 14, wherein said electronic control means are configured to reduce a measurement interruption time, to carry out a phase shifting for the partial light bundles of one of the beam paths, while another of the beam paths is selected by means of the deflecting means.

16. Optical assembly, as claimed in claim 1, further comprising an acousto-optic device in front of the adjustable deflecting means; said electronic control means configured to vary the output of a light bundle with the acousto-optic device, depending on which of the beam paths the light bundle is guided.

17. Optical assembly, as claimed in claim 16, wherein said electronic control means are configured to actuate the acousto-optic device in such a way that the light spot patterns of different beam paths have the same light output in the pupil plane.

18. Optical assembly, as claimed in claim 1, further comprising an image field rotator in the beam path behind the beam guiding means in order to change an orientation of the structured illumination, which is provided with one of the light spot patterns, and an actuating device for rotating the image field rotator is present.

19. Optical assembly, as claimed in claim 1, further comprising a zoom lens in the beam path behind the beam guiding means for a variable adjustment between a light conductance of an objective lens and a light conductance of the light spot patterns in the pupil plane.

20. Light microscope comprising at least one light source for emitting a light bundle, an optical assembly arranged in such a way that light bundles of the light source can be directed to the adjustable deflecting means, said optical assembly being in accordance with claim 1.

21. Light microscope, as claimed in claim 20, further comprising an objective lens for directing said illuminating light, which is emitted from the optical assembly; and said pupil plane of the optical assembly being optically conjugated to a pupil plane of the objective lens.

22. Light microscope, as claimed in claim 21, further comprising a sample plane in which a sample that is to be examined can be positioned, and detection light emminating from said sample being directed with the objective lens in the direction of a detector device, said objective lens illuminating light, which comes from the optical assembly, can be guided into the sample plane in such a way that a light intensity distribution in the sample plane by means of a Fourier transformation coincides with the light intensity distribution in the pupil plane of the optical assembly.

* * * * *

UNITED STATES PATENT AND TRADEMARK OFFICE
CERTIFICATE OF CORRECTION

PATENT NO. : 10,663,749 B2
APPLICATION NO. : 14/436641
DATED : May 26, 2020
INVENTOR(S) : Daniel Schwedt, Tiemo Anhut and Ralf Netz It is certified that error appears in the above-identified patent and that said Letters Patent is hereby corrected as shown below:

In the Specification

Column 2, Line 5   now reads: "field rotator, for example, an Abbe-Konig prism, can also be"
should read -- field rotator, for example, an Abbe-König prism, can also be --

Column 3, Line 39   now reads: "path of a light microscope, se such that the light distribution"
should read -- path of a light microscope, such that the light distribution --

Column 3, Line 40   now reads: "of light in the pupil plane is determined by means of a"
should read -- in the pupil plane is determined by a --

Column 9, Line 45   now reads: "sample plane relates to by means of a Fourier transformation"
should read -- sample plane relates to --

Column 9, Line 46   now reads: "coincides with the light intensity distribution in the pupil"
should read -- the light intensity distribution in the pupil --

In the Claims

Column 14, Line 51
Claim 1
now reads: "said pupil plane in which light distribution relates to the"
should read -- said pupil plane being a plane in which light distribution relates to the --

Column 14, Line 59
Claim 2
now reads: "deflector has deflecting mirror that can be rotated and/or"
should read -- deflector has a deflecting mirror that can be rotated and/or --

Column 16, Line 20
Claim 14
now reads: "means of the electro-optic modulator for phase shifting a"
should read -- means of the electro-optic modulators for phase shifting a --

Signed and Sealed this
Twenty-ninth Day of September, 2020

Andrei Iancu
*Director of the United States Patent and Trademark Office*

CERTIFICATE OF CORRECTION (continued)
U.S. Pat. No. 10,663,749 B2

| | | |
|---|---|---|
| Column 16, Line 63 | now reads: | "examined can be positioned, and detection light emminating" |
| Claim 22 | should read | -- examined can be positioned, and detection light emanating -- |